Patented Nov. 8, 1960

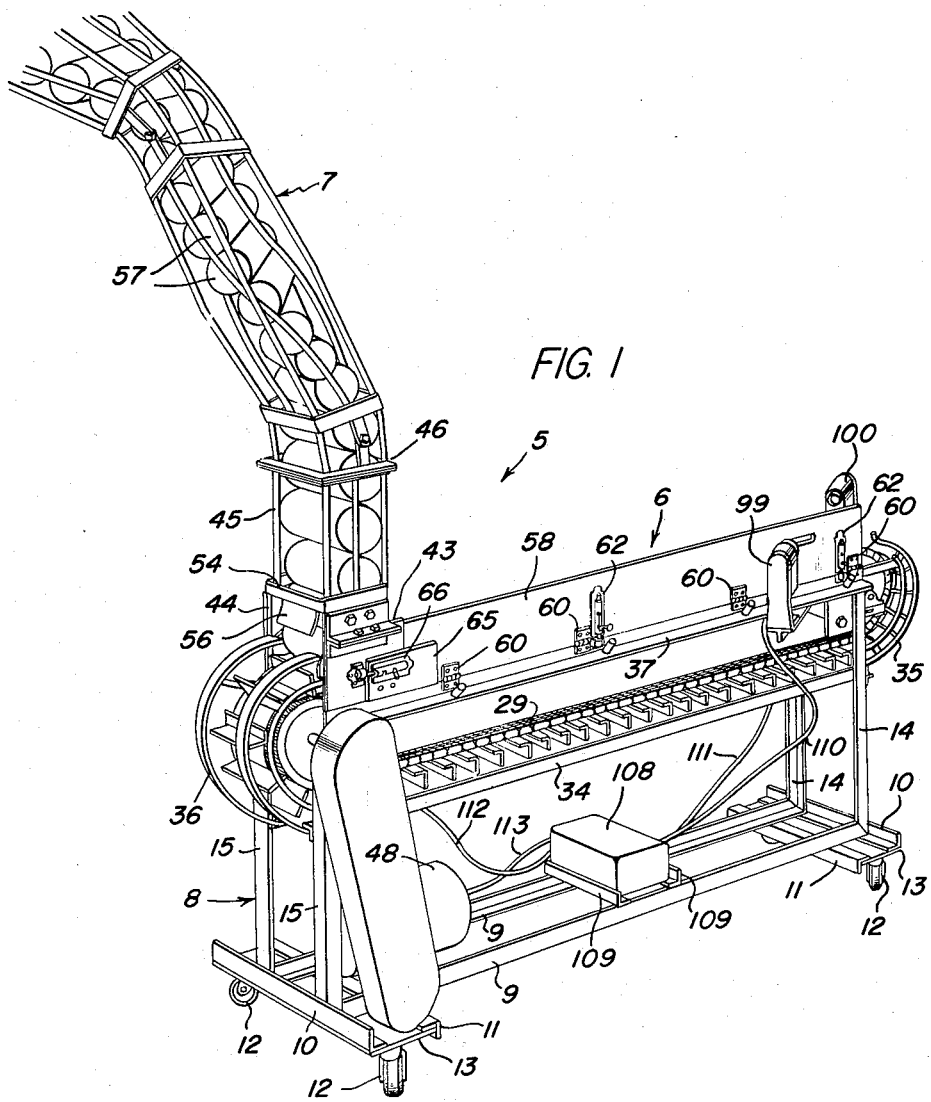

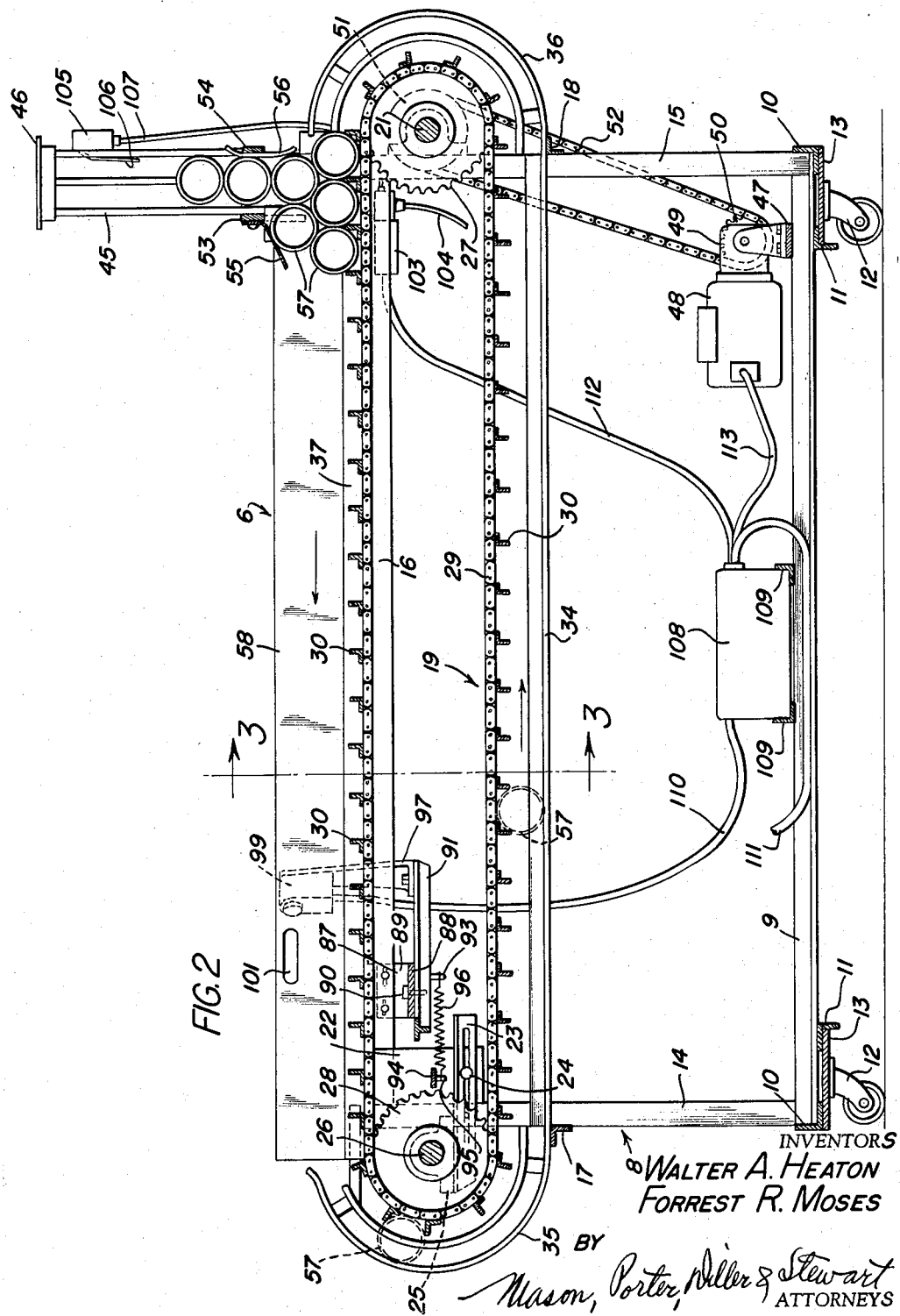

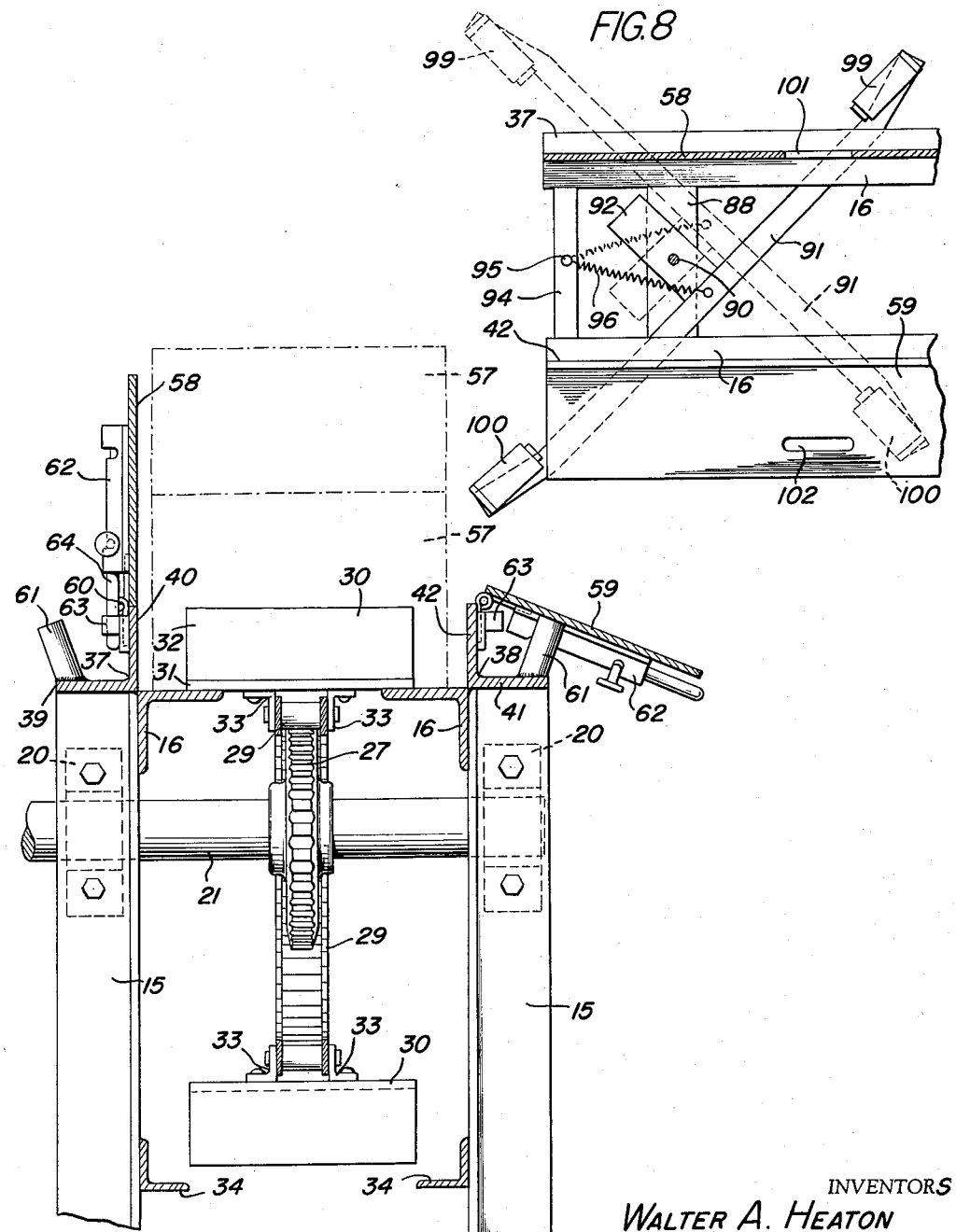

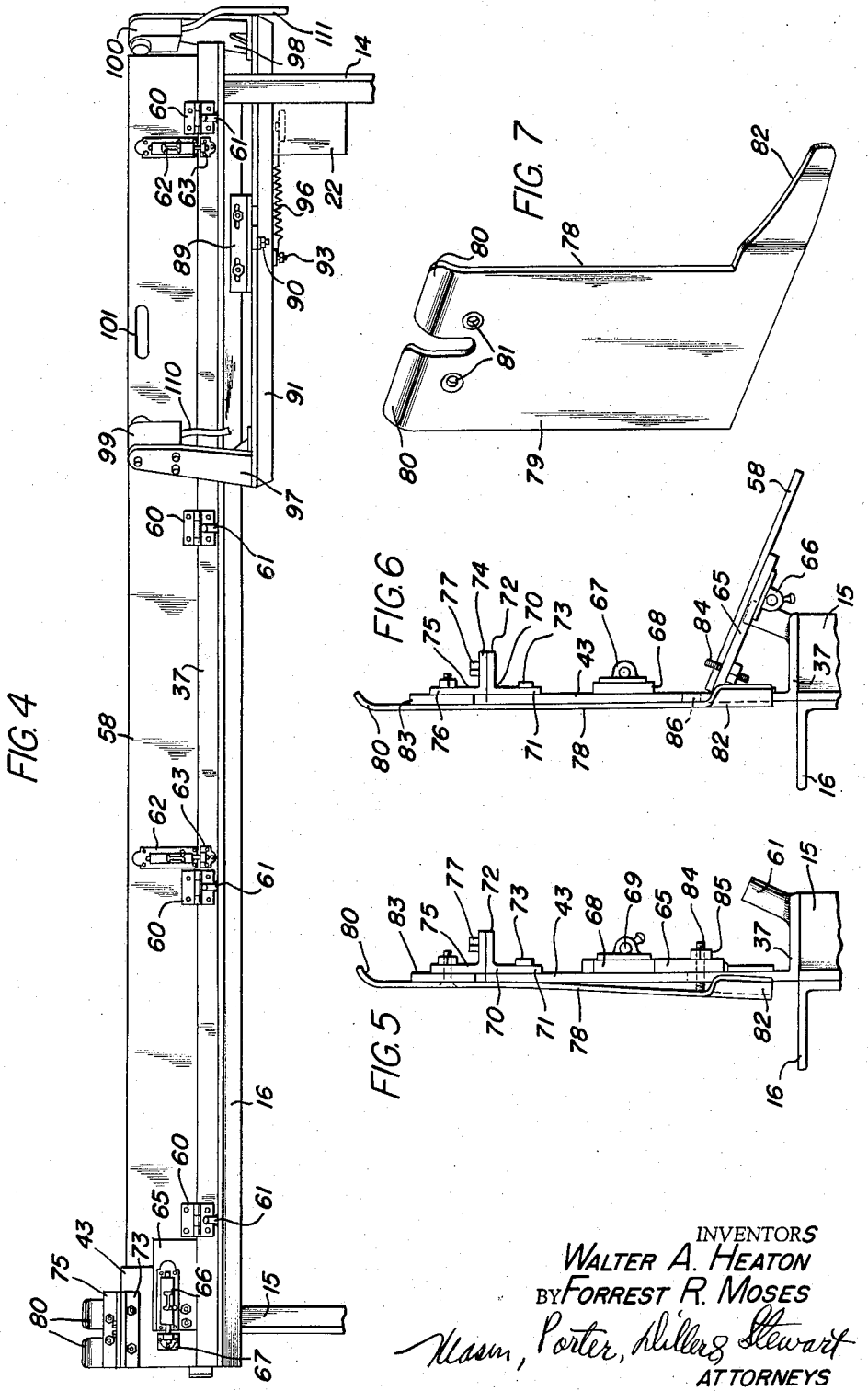

2,959,270

CAN POSITIONING MACHINE

Walter A. Heaton and Forrest R. Moses, Milwaukee, Wis., assignors to Continental Can Company, Inc., New York, N.Y., a corporation of New York Filed Jan. 20, 1959, Ser. No. 787,869

14 Claims. (Cl. 198—35)

The invention relates generally to new and useful improvements in can handling apparatus, and more particularly to a novel machine for positioning cans for engagement by tines of a transfer fork in the stacking of cans for shipment.

In the past it has been found that the best mode of shipping cans, either in vehicles or boxes, is to stack the cans in side-by-side relation. In order to accomplish this, there has been devised means for moving the cans in a generally horizontal path with the open ends of the cans all facing in the same direction. The cans are then engaged with a transfer fork by placing the tines of the transfer fork into the cans through the open ends of the cans. In order that the cans may be free to be removed by the transfer fork, the cans are generally conveyed by means of an endless belt type conveyor. As a result, it is necessary that the conveyor be provided with suitable back-up means for the cans to limit rearward movement of the cans as the transfer fork engages the cans. The back-up means, on the other hand, prevent removal of the cans from the opposite side of the conveyor and thus greatly limits the use of a machine.

During the normal stacking of cans it is highly desirable that the machine positioning the cans for engagement by the transfer fork be universal. This is particularly true in conjunction with the loading of freight cars wherein cans are supplied through the center doors and stacked from the ends of the freight car towards the center. Also, if the can positioning machine were constructed for unloading from one side only, there would be many permanent, as well as movable, installations which would require right and left hand can positioning machines. This, of course, is undesirable in that not only would special can positioning machines be required for individual installations, but also replacement and repair problems would arise.

It is therefore the primary object of the invention to provide a novel can positioning machine for use in the stacking of cans utilizing a transfer fork, which machine will arrange cans to be stacked in side-by-side relation and with open ends of the cans all facing in the same direction, and wherein the direction in which the cans face may be changed so that cans may be selectively removed from both sides of the can positioning machine and thus render the can positioning machine universal in use.

Another object of the invention is to provide a novel machine for positioning cans in side-by-side relation for engagement by tines of a transfer fork, the machine including a conveyor having a straight run and means for positioning cans on the conveyor with open ends of the cans all facing in the same direction, the means for positioning the cans being of such a nature whereby the direction in which the cans face may be reversed, and the machine also including can back-up plates along opposite edges of the conveyor straight run for limiting the movement of the cans when engaged by the transfer fork, the can back-up plates being so mounted whereby they may either be raised for engagement by cans or lowered to out of the way positons when not required to permit cans to be removed equally as well from opposite sides of the machine.

Still another object of the invention is to provide a machine for positioning cans for engagement by a transfer fork in the process of stacking cans, the machine including a can positioning conveyor having a horizontal run, and drive means for operating the can positioning conveyor, the drive means including a control device for automatically stopping the operation of the can positioning conveyor when the cans on the conveyor reach a predetermined point to retain the cans in position for engagement by a transfer fork, the control device being mounted for movement to opposite sides of the conveyor whereby the control device may be positioned out of the way of a can transferring operation.

A further object of the invention is to provide a machine for automatically positioning the cans in side-by-side relation with the cans having open ends all facing in the same direction, the machine having can backing plates hingedly mounted whereby cans may be selectively backed up from one of two directions and thus selectively unloaded from opposite sides of the machine, and a can twisting device for feeding cans into the machine, the can twisting device being adjustable to control the direction which the cans on the machine face, the machine also including a feed control device responsive to positions of cans on the machine to control the operation of the machine, the feed control device being pivotally mounted for movement from one side of the machine to the other side of the machine whereby the feed control device may be always disposed out of the way of the can transferring operation.

Still another object of the invention is to provide a machine for positioning cans in side-by-side relation with the open ends of the cans all facing in the same direction, the machine including a can suporting conveyor having a straight run, a pair of can back-up plates extending along the conveyor straight run on opposite sides thereof, the can back-up plates being pivotally mounted whereby the individual can back-up plates may be moved from an inoperative position to an operative position and thus restrain cans against rearward movement when being engaged by a transfer fork, the machine also including resiliently mounted can guide plates disposed on opposite sides of the conveyor at the feed end of the conveyor and means on the can back-up plates engaging respective ones of the can guide plates to swing the can guide plate inwardly towards the conveyor when the can back-up plate is in a can backing position to position cans on the conveyor in spaced relation to the particular can back-up plate.

A still further object of the invention is to provide a machine for positioning cans in side-by-side relation with open ends of the cans all facing in the same direction for engagement by tines of a transfer fork, the machine including a conveyor having can receiving pockets, the conveyor being of the recirculating type and including a straight run from which cans are removed in a can transferring operation, can back-up plates individually mounted on opposite sides of the conveyor straight run for movement between an inoperative position and a can backing position whereby cans may be removed from opposite sides of the conveyor, the conveyor having a feed end, and can guide plates at the conveyor feed end for moving newly fed cans and recirculated cans into positions on the conveyor spaced from the can back-up plates to eliminate frictional contact between moving cans and the back-up plates.

With the above, and other objects in view that will hereinafter appear, the nature of the invention will be more clearly understood by reference to the following detailed description, and appended claims and the several views illustrated in the accompanying drawing:

In the drawing:

Figure 1 is a perspective view of the can positioning machine including the can twisting delivery conveyor.

Figure 2 is an enlarged rotated side elevational view of the can positioning machine with a side portion of the frame thereof broken away.

Figure 3 is an enlarged fragmentary transverse vertical sectional view taken on the line 3—3 of Figure 2.

Figure 4 is an enlarged fragmentary side elevational view of the upper portion of the can positioning machine with the can positioning conveyor and the can delivery conveyor omitted for purposes of clarity.

Figure 5 is an enlarged fragmentary end view of the upper part of the can positioning machine and shows the details of one of the can guide plates and the relationship of the can guide plate to a respective can back-up plate.

Figure 6 is a view similar to Figure 5 and shows the can back-up plate in its lowered inoperative position and the can guide plate returned to its normal position.

Figure 7 is an enlarged perspective view of one of the can guide plates.

Figure 8 is a fragmentary plane view with parts broken away and shown in section, the view illustrating the details of the pivotal mounting of the photo-electric cell unit.

In the example of embodiment of the invention herein disclosed, the can positioning machine is referred to in general by the reference numeral 5 and the general features of the can positioning machine are best illustrated in Figure 1. The can positioning machine 5 includes a can positioning unit 6 to which cans are delivered by means of a can delivery conveyor 7.

The can positioning unit 6 includes an upright frame 8. The frame 8 is formed of a pair of lower spaced parallel frame rails 9 which are connected together at their ends by transverse frame members 10. Disposed adjacent to the transverse frame members 10 are transverse frame members 11 which also serve to connect together the lower frame rails 9. Disposed at the lower corners of the frame 8 are caster wheel assemblies 12 which include mounting plates 13 rigidly secured to respective pairs of the transverse frame members 10 and 11.

The frame 8 also includes pairs of standards 14 and 15 which are connected and extend upwardly from the ends of the lower frame rails 9. Secured to upper ends of the standards 14 and 15 and overlying the lower frame rails 9 are upper frame rails 16. A transverse frame member 17 extends between and connects together intermediate portions of the standards 14. A similar transverse frame member 18 connects together intermediate portions of the standards 15.

The frame 8 supports a can positioning conveyor which is referred to in general by the reference numeral 19. The can positioning conveyor includes a pair of transversely aligned pillow blocks 20 which are secured to upper portions of the standards 15 and in which there is rotatably journalled a drive shaft 21. In the corners defined by the standards 14 and respective ones of the upper frame rails 16 are plates 22. Supported by the plates 22 for longitudinally adjustable positioning is a pair of horizontal supports 23 which have pin and slot connections 24 with respective ones of the plates 22. The supports 23 project beyond the frame 8 and support a pair of transversely aligned pillow blocks 25. Rotatably journalled in the pillow blocks 25 is an idler shaft 26 which is aligned with the drive shaft 21.

The drive shaft 21 has positioned thereon centrally of the frame 8 a conveyor chain sprocket 27. The idler shaft 26 also has positioned thereon a conveyor chain sprocket 28 which is aligned with the conveyor chain sprocket 27. Entrained over the conveyor chain sprockets 27 and 28 is an endless conveyor chain 29. Secured to the links of the conveyor chain at regularly spaced intervals are can retaining bars 30. The bars 30 are formed of angle members with each of the bars having a generally horizontal flange 31 and a generally vertical flange 32. The bars 30 are secured to the conveyor chain 29 by means of angle brackets 33 which extend between the flanges 31 and opposite sides of links of the conveyor chain. The tension of the conveyor chain is varied by adjusting the positions of the supports 23.

As is best illustrated in Figure 3, the upper frame rails 16 also function as guides or supports for the upper run of the can positioning conveyor 19. The spacing between the upper frame rails 16 is less than the length of each of the bars 30 with the result that the bars 30 slide along the upper frame rails 16 and support the conveyor chain 29 intermediate the conveyor chain sprockets 27 and 28.

Disposed below the upper frame rails 16 and extending between the standards 14 and 15 are can guides 34. The can guides 34 are in the form of angle members so as to form suitable supporting surfaces for cans and are spaced apart a distance less than the length of the can to be handled by the can positioning machine 5. Normally the lower run of the conveyor chain 29 is slack, as is shown in Figure 3. However, when a can is being recirculated, as is illustrated in Figure 2, the recirculating can will rest on the can guides 34 and serve to support the lower run of the conveyor chain 19.

Cans are recirculated by the can positioning conveyor 19 by means of a can guide 35 which is generally semicircular in side elevation and which is mounted at the left end of the frame 8, as viewed in Figure 2. The can guide is secured in place by attachment to the transverse frame member 17 and is disposed concentric to the conveyor chain sprocket 28 to guide a can in its movement from the upper run of the can positioning conveyor 19 to the lower run of the can positioning conveyor. A second can guide 36, which is also general semicircular, is secured to the transverse frame 18 at the right end of the frame 8. The can guide 36 is disposed concentric to the conveyor chain sprocket 27 and guides cans in their movement from the lower run of the can positioning conveyor 19 to the upper run thereof. It is to be noted that the lower portions of the can guides 35 and 36 are aligned with the ends of the can guides 34.

Suitably secured to the upper ends of the standards 14 and 15 in overlying relation are elongated mounting members 37 and 38. The mounting members 37 and 38 are formed of angle members and the mounting member 37 includes a horizontal flange 39 and a vertical flange 40 whereas the mounting member 38 includes a horizontal flange 41 and a vertical flange 42. Extending upwardly from the vertical flanges 40 and 42 at the left ends thereof, as viewed in Figure 1, are plates 43 and 44 respectively. Extending upwardly from the plates 43 and 44 is a can chute 45 which is provided at the upper end thereof with an adapter plate 46 to which the lower end of the can delivery conveyor 7 is connected.

A mounting plate 47 extends between the frame rails 9 adjacent the standards 15. Suitably mounted on the mounting plate 47 is a power unit which includes an electric motor 48 and a reduction gear assembly 49. The reduction gear assembly 49 includes a drive sprocket 50 which is positioned to one side of the frame 8 out of the confines of the frame. Aligned with the drive sprocket 50 is a driven sprocket 51 carried by the drive shaft 21. Entrained over the drive sprocket 50 and the driven sprocket 51 is a drive chain 52 which drivingly connects the drive shaft 21 to the power unit and thus drives the can positioning conveyor 19.

The lower end of the can chute 45 has a transverse gate bar 53 which regulates the flow of cans out of the lower end of the can chute 45 and onto the can positioning conveyor 19. A similar can gate 54 is mounted on the opposite side of the can chute from the can gate 53.

As is illustrated in the drawings, the upper run of the can positioning conveyor 19 is intended to convey two rows of cans and the gate bar 53 is positioned accordingly. However, if only one row of cans is to be conveyed, the gate bar 53 will be longer as shown in dotted lines. A flexible flap 55 is connected to the gate bar 53 in depending relation and will engage cans of the upper row of cans to both stabilize the cans and cut down can chatter. An extension 56 is secured to the can gate 54 in depending relation to prevent the escape of cans.

The can delivery conveyor 7 is secured to the upper end of the can chute 45 and the opposite end of the can delivery conveyor 7 (not shown) is connected to a suitable can supply source. The can supply is of such a nature whereby cans delivered to the can delivery conveyor 7 all have their open ends facing in the same direction. The can delivery conveyor is of a flexible construction whereby the can positioning unit may be moved about within limits as can stacking conditions require. Also the can delivery conveyor is of the can twisting type and twists cans so that the open ends of the cans will face in the desired direction when placed on the can positioning conveyor 19. The twisting mechanism of the can delivery conveyor 7 is readily adjustable whereby the direction in which open ends of the cans face may be varied, as is desired.

Cans, such as the cans 57 of Figure 2, will be removed from the can positioning conveyor 19 by means of a transfer fork (not shown) which has tines so spaced whereby each tine will be received in a can. When the cans 57 are being removed from the can positioning machine 5 through the use of a transfer fork, it is necessary to back up the cans otherwise they may be pushed off of the can positioning conveyor by the transfer fork. In order to prevent this, disposed on opposite sides of the upper run of the can positioning conveyor 19 are can back-up plates 58 and 59 which are identical except for being right and left. In view of this, only the back-up plate 58 and its mounting means will be described in detail.

As is best illustrated in Figures 3 and 4, the back-up plate 58 extends from the plate 43 as an extension thereof to a point slightly beyond the end of the frame 8. The back-up plate 58, when vertically disposed, also forms a vertical continuation of the vertical flange 40 of the mounting member 37. The lower edge portion of the back-up plate 58 is hingedly connected to the vertical flange 40 by means of a plurality of longitudinally spaced hinges 60. Due to the hinge type mounting of the back-up plate 58, it has a tendency to swing to a lowered inoperative position, such as the position of the back-up plate 59 in Figure 3. The downwardly swinging movement of the back-up plate 58 is limited by engagement of the back-up plate 58 with stop pins 61. The stop pins 61 are aligned with the hinges 60 and extend upwardly and outwardly from the horizontal flange 39 of the mounting member 37. The horizontal flange 41 of the mounting member 38 is provided with similar stop pins 61 for the back-up plate 59.

The back-up plates 58 and 59 are selectively retained in upright positions by suitable latch means. Referring to Figure 4, it will be seen that the back-up plate 58 is provided with a plurality of vertically disposed latch bolt assemblies 62 which are aligned with keepers 63 carried by the mounting member 37. Each bolt assembly 62 has a slidable bolt 64 which is engaged in its respective keeper 63 to retain the back-up plate 58 in its vertical position. The left end of the back-up plate 58, as viewed in Figure 4, is provided with an extension plate 65 which is disposed in overlapping relation to both the back-up plate 58 and the plate 43. Mounted on the extension plate 65 is a horizontally disposed latch bolt assembly 66 which is aligned with a keeper 67 carried by the plate 43. As is best shown in Figure 6, the keeper 67 is spaced from the plate 43 by a spacer 68 which has a thickness substantially equal to the thickness of the extension plate 65. The latch bolt assembly 66 includes a bolt 69 which is engaged with the keeper 67 to retain the back-up plate 58 in its upright position. The back-up plate 59 will, of course, be provided with similar latch means.

The upper part of each of the plates 43 and 44 is provided with a horizontally disposed angle bracket 70 which has a vertical flange 71. The vertical flange 71 is disposed in face-to-face engagement with the respective one of the plates 43 and 44 and is secured thereto by fasteners 73. Seated on the horizontal flange 72 of each of the angle brackets 70 is a horizontal flange 74 of an angle bracket 75. The angle bracket 75 also has a vertical flange 76 which is aligned with the vertical flange 71. The horizontal flanges 72 and 74 are secured together by fasteners 77.

Disposed inwardly of the plates 43 and 44 are can guides 78. The two can guides 78 are identical with the exception that one is a right can guide and other is a left can guide. In view of this, only the can guide attached to the plate 43 will be described in detail. Referring now to Figure 7 in particular, the can guide 78 includes a generally rectangular sheet type body 79 which terminates at the upper edge thereof in a pair of spaced integral guide portions 80 which are upwardly and outwardly curved. Each of the guide portions has a countersunk bore 81 therethrough adjacent the lower edge thereof. The body 79 terminates at the lower right corner in an integral guide portion 82 which is curved to the right and outwardly.

Each can guide 78 is formed of a resilient material and is secured to its respective angle bracket 75 by means of fasteners extending through the bores 81 and through the vertical flange 76 of the angle bracket 75. Disposed intermediate the can guide 78 and the vertical flange 76 is a spacer 83 which has a thickness substantially equal to the thickness of the plates 43 and 44 so that normally the can guide 78 is disposed in face-to-face engagement with the inner surface of its respective one of the plates 43 and 44.

As is best illustrated in Figure 4, each extension plate 65 is provided with a pair of stop members 84 which pass through the extension plate 65 and are threadedly engaged therein. The outer portions of the stop members 84 are provided with lock nuts 85 which retain the stop members in adjusted positions. The plates 43 and 44 are provided with elongated slots 86 aligned with the stop members 84 and through which slots the stop members pass when the respective one of the back-up plates 58 and 59 is in an upright position. The stop members 84 engage the lower portion of a respective can guide 78 when their back-up plate is in an upright position and thus spring the lower portion of the can guide 78 inwardly to the position shown in Figure 5. As a result, when cans 57 engage the can guide in its inwardly sprung position, the cans are moved away from the upright back-up plate to eliminate the frictional contact with the back-up plate.

In Figures 2 and 8 there are illustrated the details of means for mounting a control device of the photo-electric cell type. The mounting means includes a generally U-shaped mounting bracket 87 which is formed of a strap 88 having angle brackets 89 at its opposite ends. The angle brackets 89 are adjustably secured to the upper frame rails 16 in depending relation with the strap 88 extending transversely of the frame 8 below the upper frame rails 16.

The strap 88 has a centrally located pivot pin 90 which is disposed along the center line of the frame 8. The mounting means for the control device also includes an elongated support arm 91. Connected to the center of the support arm 91 and extending therefrom generally at right angles thereto, is a plate 92. The plate 92 receives the pivot pin 90 and thus mounts the support arm 91 in offset relation to the pivot pin and for swinging about the pivot pin.

Projecting downwardly from the support arm 91 is a pin 93 which is disposed along a line normal to the axis of the support bar and passing through the pivot pin 90. Extending transversely between the plates 22 and terminally secured to the plates 22 is a strap 94. The strap 94 has a centrally located depending pin 95 which is disposed along the center line of the frame 8. A spring 96 has the opposite ends thereon connected, under tension, to the pins 93 and 95. Since thet pin 93 is beyond the pivot pin 90 from the pin 95, the spring 96 has an over center action on the support arm and retains the support arm in the last moved to position.

Removably secured to opposite ends of the support arm 91, as is best illustrated in Figure 4, are upstanding support brackets 97 and 98. Secured to the upper part of the support 97 is a light sensitive cell unit 99 of a photo-electric cell unit. The support bracket 98 supports a light source 100 which is aligned with the light sensitive cell unit 99 at all times.

In Figure 4 the back-up plate 58 is illustrated in its upright position. At this time the support arm 91 is in the solid line position of Figure 8 with the light sensitive cell unit 99 being disposed adjacent the back-up plate 58 and the light source 100 being on the other side of the frame 8 at the end of the frame and out of the way of a can transferring operation. In order to prevent interruption of the light ray from the light source 100 to the light sensitive cell 99, the back-up plate 58 is provided with a light passage 101 and a similar light passage 102 is formed in the back-up plate 59. On the other hand, when the back-up plate 58 is lowered to its lowered inoperative position and the back-up plate 59 is swung to its upright position, the support arm 91 is also swung to its dotted line position of Figure 8. At this time the light source 100 is disposed adjacent the back-up plate 59 and the light sensitive cell unit 99 is disposed in an out-of-the-way position at the end of the frame 8. The light from the light source 100 now passes through the light passage 102.

The operation of the electric motor 48 is automatically controlled by electrical controls. These electrical controls include a manual on-off switch 103 which is suitably mounted on the frame 8. Connected to the switch 103 is a power cable 104 which may be connected to a desired source of electrical power (not shown). A normally open switch 105 is mounted on the can chute 45. The switch 105 has an actuator 106 which projects into the can chute 45 and which is engaged by cans 57 disposed within the can chute to close the switch 105. The switch 105 is connected in series with the switch 103 by an electric cable 107.

The photo-electric cell control device includes a control unit 108 which is mounted on a pair of frame members 109 extending between the lower frame rails 9. The light sensitive cell unit 99 is connected to the control unit 108 by an electric cable 110, and an electric cable 111 leads from the control unit 108 to the light source 100. The control unit 108 also includes a switch (not shown) which is operated through the light sensitive cell unit 99. This last mentioned switch is also connected in series with the switch 103 and the electric motor 48 by electrical cables 112 and 113, respectively. It is pointed out that although the light source 100 and the light sensitive cell unit 99 are illustrated as being positioned for interruption of the light ray from the light source 100 by cans of the upper row of cans only, these may be positioned to have the light ray interrupted by cans 57 resting directly on the can positioning conveyor 19.

Operation

A typical use of the can positioning machine 5 is in loading a freight car with cans. A freight car has centrally located doors through which the cans are fed. The cans are first stacked in one half of the freight car from the end to the center and then in the other half of the freight car from the end to the center, after which the cans are stacked in the center of the freight car. The can positioning machine 5 is illustrated in Figure 1 ready for the removal of cans from the far side thereof, the back-up plate 58 being elevated and the back-up plate 59 being lowered.

The can delivery conveyor 7 is so adjusted whereby as the cans 57 pass therethrough, the cans are twisted so that the open ends of the cans face away from the back-up plate 58. As the cans 57 pass down through the can chute 45, the cans at first come to rest on the can positioning conveyor 19 between the bars 30 to form a lower row of cans. As long as the supply of cans is proper, the cans will accumulate in the can chute 45 with an upper row of cans being nested on the lower row of cans. The existence of cans in the upper part of the can chute will retain the switch 105 in its closed position with the result that the electric motor 48 will be energized and the can positioning conveyor 19 driven. The two rows of cans 57 will then move from right to left, as viewed in Figure 2, until such time as the light ray from the light source 100 to the light sensitive cell unit 98 is broken at which time the electric motor 48 will be de-energized and the operation of the can positioning conveyor 19 discontinued until at least the further advanced can of the upper row of cans is removed.

After the cans 57 have been positioned in rows on the upper run of the can positioning conveyor 19, the cans of the two rows are simultaneously removed using a transfer fork. After the cans have been so removed, the electric motor 48 is again automatically energized to drive the can positioning conveyor. The cans of the lower row of cans which are not removed by the transfer fork will be recirculated by the can positioning conveyor and returned to the upper run thereof to be removed by the transfer fork. This operation is continued until such time as the can stacking operation reaches the point where it is more convenient to remove the cans from the opposite side of the can positioning machine 5. At this time, the back-up plate 59 is raised and locked in its upright position and the back-up plate 58 is lowered to its inoperative position. Also, the can twisting mechanism of the can delivery conveyor 7 is adjusted to reverse the direction in which the open ends of the cans face and the support bar 91 is pivoted to its dotted line position of Figure 8. The can positioning machine is now ready for the removal of cans from the near side thereof, as viewed in Figure 1.

It is obvious that many changes in the details of construction may be made without departing from the spirit of the invention, as set forth in the appended claims.

What is claimed as new is:

1. A machine for positioning cans in side-by-side relation with open ends of the cans facing in the same direction for engagement by the tines of a transfer fork, said machine comprising a frame, a can positioning conveyor carried by said frame, said can positioning conveyor having a generally straight run and means for retaining cans in side-by-side relation along said straight run, can back-up plates disposed along opposite edges of said straight run for preventing movement of cans off of said can positioning conveyor as the cans are engaged by a transfer fork during a can transferring operation, hinge means hingedly securing said back-up plates to said frame for pivoting between upright can backing positions and lowered inoperative positions, and cooperating means on said frame and said back-up plates for individually retaining said back-up plates in said upright positions, said can positioning conveyor including a drive mechanism and control means for controlling the operation of said drive mechanism, said control means including a control device responsive to the movement of a can beyond a predetermined location along said straight run, and a pivotally mounted support arm for said control device whereby said control device may be selectively positioned in out of the way positions on opposite sides of said frame.

2. The machine of claim 2 wherein said control device is of the photo-electric cell type and includes a light source and a photo-electric cell mounted on opposite ends of said support arm in opposed relation.

3. A machine for positioning cans in side-by-side relation with open ends of the cans facing in the same direction for engagement by the tines of a transfer fork, said machine comprising a frame, a can positioning conveyor carried by said frame, said can positioning conveyor having a generally straight run and means for retaining cans in side-by-side relation along said straight run, can back-up plates disposed along opposite edges of said straight run for preventing movement of cans off of said can positioning conveyor as the cans are engaged by a transfer fork during a can transferring operation, hinge means hingedly securing said back-up plates to said frame for pivoting between upright can backing positions and lowered inoperative positions, and cooperating means on said frame and said back-up plates for individually retaining said back-up plates in said upright positions, said can positioning conveyor including a drive mechanism and control means for controlling the operation of said drive mechanism, said control means including a control device responsive to the movement of a can beyond a predetermined location along said straight run, a support arm, pivot means pivotally mounting said support arm on said support for swinging movement beneath said conveyor straight run between diagonal positions on opposite sides of the center line of said conveyor straight run, means mounting said control device on said support arm for selective positioning in out of the way positions on opposite sides of said frame.

4. The machine of claim 3 with the addition of a support arm retaining spring, one end of said spring being connected to said frame along the center line of said conveyor straight run, and the opposite end of said spring being connected to said support arm along a line normal to the longitudinal axis of said support arm and passing through said pivot means, the connection between said spring and said support arm being beyond said pivot means from said one end of said spring whereby said spring is of the over center type and holds said support arm in the last moved position.

5. The machine of claim 3 wherein said control device is of the photo-electric cell type and includes a light source and a photo-electric cell mounted on opposite ends of said support arm in opposed relation.

6. A machine for positioning cans in side-by-side relation with open ends of the cans facing in the same direction for engagement by the tines of a transfer fork, said machine comprising a frame, a can positioning conveyor carried by said frame, said can positioning conveyor having a generally straight run and means for retaining cans in side-by-side relation along said straight run, can back-up plates disposed along opposite edges of said straight run for preventing movement of cans off of said can positioning conveyor as the cans are engaged by a transfer fork during a can transferring operation, hinge means hingedly securing said back-up plates to said frame for pivoting between upright can backing positions, and lowered inoperative positions, cooperating means on said frame and said back-up plates for individually retaining said back-up plates in said upright position, and a can delivery conveyor connected to said frame for delivering cans to said positioning conveyor, said can delivery conveyor being of the can twisting type whereby the direction in which cans positioned on said can positioning conveyor face may be controlled and cans may be taken from the desired side of the machine, said can positioning conveyor including a drive mechanism and control means for controlling the operation of said drive mechanism, said control means including a control device responsive to the movement of a can beyond a predetermined location along said straight run, and a pivotally mounted support arm for said control device whereby said control device may be selectively positioned in out of the way positions on opposite sides of said frame.

7. A machine for positioning cans in side-by-side relation with open ends of the cans facing in the same direction for engagement of tines of a transfer fork, said machine comprising a frame, a can positioning conveyor carried by said frame, said can positioning conveyor having a generally straight run, and independently operable can back-up means disposed along opposite edges of said conveyor straight run for preventing movement of cans off of said can positioning conveyor as the cans are engaged by the transfer fork during a can transferring operation whereby cans may be removed from the desired side of the machine, said can back-up means including a mounting member secured to said frame at each side of said can positioning conveyor along said conveyor straight run, a can back-up plate for each of said mounting members, hinge means extending between each of said mounting members and a respective can back-up plate and mounting said can back-up plate for movement between an upright can backing position and a lowered out of the way position, and latch means for retaining said can back-up plate in said upright position, said can positioning conveyor including a drive mechanism and control means for controlling the operation of said drive mechanism, said control means including a control device responsive to the movement of a can beyond a predetermined location along said straight run, and a pivotally mounted support arm for said control device whereby said control device may be selectively positioned in out of the way positions on opposite sides of said frame.

8. A machine for positioning cans in side-by-side relation with open ends of the cans facing in the same direction for engagement by the tines of a transfer fork, said machine comprising a frame, a can positioning conveyor carried by said frame, said can positioning conveyor having a generally straight run and means for retaining cans in side-by-side relation along said conveyor straight run, a can back-up plate disposed along that edge of said conveyor straight run remote from the open ends of the cans for preventing movement of cans off said can positioning conveyor during a can transferring operation, said can positioning conveyor having a can receiving portion including a guide plate disposed along the same side of said conveyor as said can back-up plate and projecting inwardly of said can back-up plate towards said can positioning conveyor to space cans from said can back-up plate as the cans move along said conveyor straight run.

9. The machine of claim 8 wherein said can back-up plate is hingedly mounted for movement to a lowered out of the way position and said guide plate is resilient and supported adjacent the upper end thereof only, said can back-up plate having a projecting portion engaging said guide plate when said can back-up plate is in an operative position to force said guide plate inwardly to its can guiding position.

10. The machine of claim 8 wherein said can positioning conveyor is of the can recirculating type and returns unremoved cans through said can receiving portion, said guide plate having a portion projecting generally along the line of travel of an adjacent portion of said can positioning conveyor and engaging and repositioning returning cans.

11. A machine for positioning cans in side-by-side relation with open ends of the cans facing in the same direction for engagement by the tines of a transfer fork, said machine comprising a frame, a can positioning conveyor carried by said frame, said can positioning conveyor having a generally straight run and means for retaining cans in side-by-side relation along said straight run, can back-up plates disposed along opposite edges of said straight run for preventing movement of cans off said can positioning conveyor as the cans are engaged in a transfer fork during a can transferring operation, hinge means hingedly securing said back-up plates to said frame for pivoting between upright can backing positions and lowered inoperative positions, cooperating means on said frame and said back-up plates for individually retaining said back-up plates in said upright positions, said can positioning conveyor having a can receiving portion including a pair of guide plates disposed in opposed relation, said guide plates each projecting inwardly of a respective one of said can back-up plates towards said can positioning conveyor to space cans from said can back-up plates as the cans move along said conveyor straight run.

12. The machine of claim 11 wherein each of said guide plates is resilient and is supported adjacent the upper end thereof only, each of said can back-up plates having a projecting portion engaging a lower part of a respective one of said guide plates when said can back-up plate is in an upright position to force said respective guide plate inwardly to its can guiding position whereby the relative position between cans and said can positioning conveyor is shifted transversely of said can positioning conveyor when one of said can back-up plates is lowered and the other of said can back-up plates is raised.

13. The machine of claim 12 wherein said can positioning conveyor is of the can recirculating type and returns unremoved cans through said can receiving portion, said guide plates each having a portion projecting generally along the line of travel of an adjacent portion of said can positioning conveyor and engaging and repositioning returning cans.

14. The machine of claim 11 wherein said can positioning conveyor is of the can recirculating type and returns unremoved cans through said can receiving portion, said guide plates each having a portion projecting generally along the line of travel of an adjacent portion of said can positioning conveyor and engaging and repositioning returning cans.

References Cited in the file of this patent

UNITED STATES PATENTS

| | | |
|---|---|---|
| 2,097,368 | Frank | Oct. 26, 1937 |
| 2,420,343 | Albertoli | May 13, 1947 |
| 2,800,211 | Madden | July 23, 1957 |
| 2,868,350 | Madden | Jan. 13, 1959 |